US008001001B2

(12) United States Patent
Brady et al.

(10) Patent No.: US 8,001,001 B2
(45) Date of Patent: Aug. 16, 2011

(54) SYSTEM AND METHOD USING SAMPLING FOR ALLOCATING WEB PAGE PLACEMENTS IN ONLINE PUBLISHING OF CONTENT

(75) Inventors: Colin Brady, Sunnyvale, CA (US); Rica Gonen, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1020 days.

(21) Appl. No.: 11/897,787

(22) Filed: Aug. 30, 2007

(65) Prior Publication Data
US 2009/0063377 A1 Mar. 5, 2009

(51) Int. Cl.
G06Q 30/00 (2006.01)
(52) U.S. Cl. .................................. 705/14.43
(58) Field of Classification Search ............... 705/14.43
See application file for complete search history.

(56) References Cited

U.S. PATENT DOCUMENTS

| 2001/0020236 | A1* | 9/2001 | Cannon ........................... 707/1 |
| 2003/0149622 | A1* | 8/2003 | Singh et al. .................... 705/14 |
| 2006/0184417 | A1* | 8/2006 | Van der Linden et al. ...... 705/14 |
| 2006/0212350 | A1* | 9/2006 | Ellis et al. ...................... 705/14 |
| 2007/0038508 | A1* | 2/2007 | Jain et al. ....................... 705/14 |
| 2007/0174114 | A1* | 7/2007 | Bigby et al. .................... 705/14 |
| 2008/0249832 | A1* | 10/2008 | Richardson et al. ............ 705/10 |
| 2008/0306804 | A1* | 12/2008 | Opdycke et al. .................. 705/8 |

* cited by examiner

Primary Examiner — C. M. Tarae
(74) Attorney, Agent, or Firm — Buchenhorner Patent Law

(57) ABSTRACT

An improved system and method is provided for using sampling for allocating web page placements in online publishing of content. A multi-armed bandit engine may be provided for sampling content items by allocating web page placements of varying quality for content items and optimizing the payoff to maximize revenue. Publishers may provide content items to be published and report their valuation per click. Through a process of valuation discovery, the click-through rate for content items and the value of content items may be learned through sampling. As the process of valuation discovery progresses, the present invention may more closely approximate the click-through rates for content items in order to allocate web page placements to content items that may optimize content layout by maximizing revenue. The present invention may accurately learn the CTR for new content items and support multiple web page placements of varying quality.

18 Claims, 10 Drawing Sheets

SYSTEM AND METHOD USING SAMPLING FOR ALLOCATING WEB PAGE PLACEMENTS IN ONLINE PUBLISHING OF CONTENT

FIELD OF THE INVENTION

The invention relates generally to computer systems, and more particularly to an improved system and method using sampling for allocating web page placements in online publishing of content.

BACKGROUND OF THE INVENTION

Optimally placing content on a web page is a widely held problem. In print media, content layout may be done at the editorial staff's sole discretion. Traditionally, editors have relied on their experience and rules of thumb to determine which articles should be placed on a page and how the selected articles should be arranged. Web publishing, however, is more complicated than the traditional approach to print media since it is possible to turn over content on a more frequent basis online. Furthermore, publishers may tailor content online for each visiting audience. The inclusion of these additional capabilities for web publishing, while advantageous to the publisher, greatly increases the difficulty of the editorial staff's task by multiplying the number of editorial decisions that need to be made to keep a media property up to date.

As web publishing continues to mature and online publishers compete to increase efficiency and revenue for online publishing, there is an increasing demand for the creation of tools to help publishers simplify the compounded editorial decision making problem in web publishing. First of all, there needs to be tools to help editors optimize content layout and to efficiently share content published at different website locations. Second, there needs to be tools to help editors compare the performance of content. Third, there needs to be tools to optimize layout of content items for user-level content personalization.

What is needed is a system and method for optimizing content layout in web publishing that may help publishers simplify editorial decision making and increase revenue. Such a system and method should provide feedback from online publishing systems that can be used to accurately tune content in real time, helping editors keep up to date and maximize revenue for each user visit.

SUMMARY OF THE INVENTION

Briefly, the present invention may provide a system and method using sampling for allocating web page placements in online publishing of content. In an embodiment, a multi-armed bandit engine may be provided for sampling content items by allocating web page placements of varying quality for content items and optimizing the payoff to maximize revenue. Publishers may provide content items to be published and report their valuation per click for the content items. And the multi-armed bandit engine may select an optimal set of content items to be allocated web page placements for optimizing content layout to maximize revenue. Web page placements may then be determined and allocated for content items in the optimal set either by using fair chance slotting or iterative sampling. Parameters for content items sampled may be updated including the click-through rate, payoff, and confidence parameters. And a payoff may be calculated for each content item allocated the web page placement and sampled in the online publishing system.

In general, the multi-armed bandit mechanism may run in time rounds, and content items may be allocated web page placements during a time round. Initially, a set of potential content items may be selected for sampling by removing content items with a payoff lower than a threshold from the list of content items currently in the online publishing system. The list of remaining content items may represent a set of potential content items to sample in the online publishing system during the current time period. If there may be a significant proportion of potential content items to be sampled that do not have click-through rates, then web page placements may be allocated for content items to be sampled using fair chance slotting. In this case, web page placements sorted in ascending order may be matched with the content items sorted in descending order. This may allow content items with a lower payoff to be allocated locations of web page placements with a higher click probability in order to provide a fair chance to learn click through rates of content items. Otherwise, web page placements may be allocated for content items to be sampled using iterative sampling. In this case, web page placements may be sorted in rank order by normalized click probability. Then a content item may be randomly selected from an optimal subset of content items for allocation to the highest ranked unallocated web page placement. After the content item may be allocated, the content item may be removed from the set of content items. Each remaining highest ranked unallocated web page placement may be similarly allocated a content item randomly selected from an optimal subset of content items until the unallocated web page placements are allocated.

An online publishing application may deploy the present invention to learn the valuation of new content items using sampling through a process of valuation discovery. As the process of valuation discovery progresses, the present invention may more closely approximate the click-through rates for content items in order to allocate web page placements to content items that may maximize revenue. Thus, online publishing applications may use the present invention to optimize layout of content from various content properties to maximize revenue or may use the present invention to optimize placement of content items for user-level content personalization. Other advantages will become apparent from the following detailed description when taken in conjunction with the drawings, in which:

DETAILED DESCRIPTION

Exemplary Operating Environment

Figure 1:
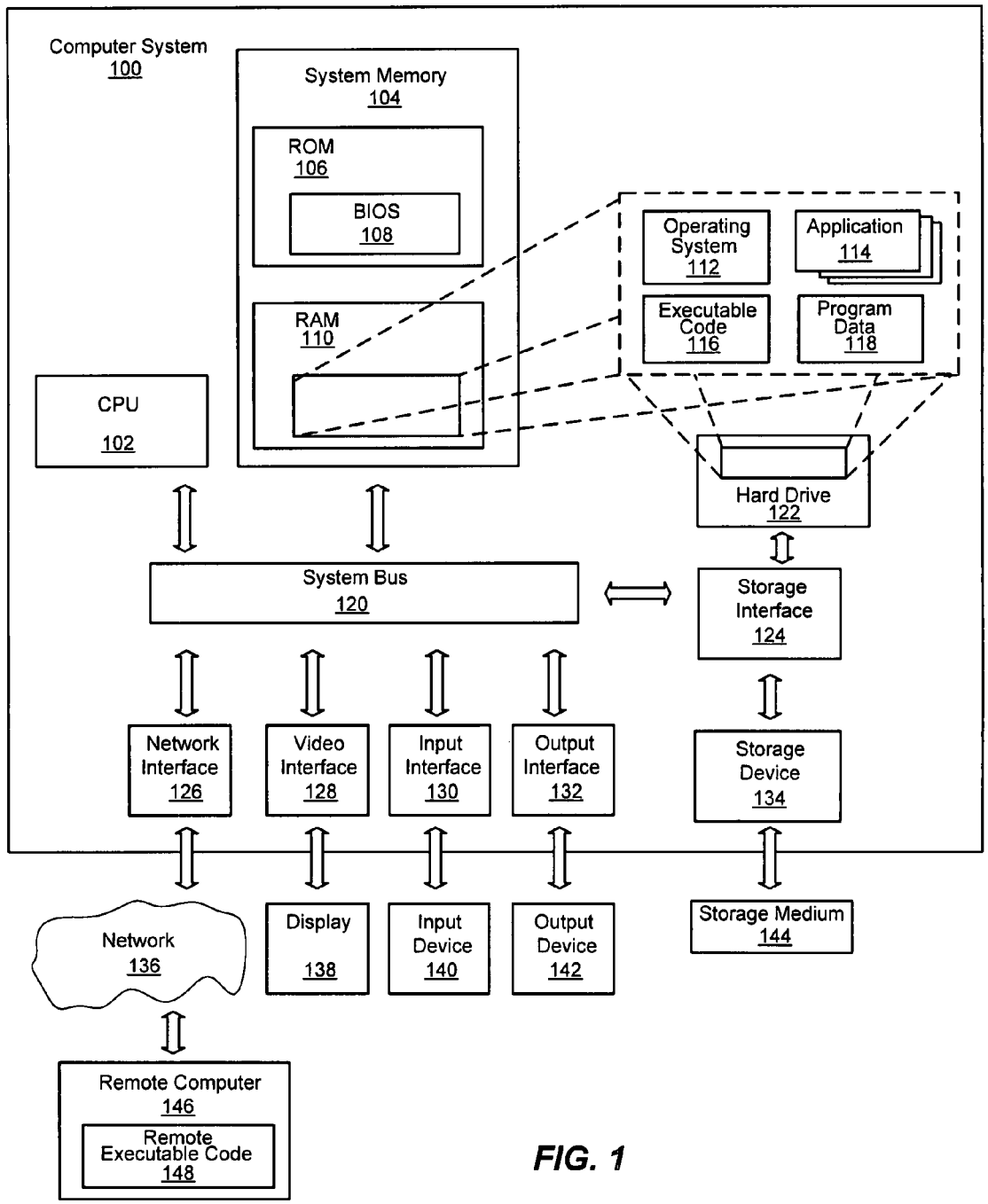
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Using Sampling to Allocate Web Page Placements in Online Publishing of Content

The present invention is generally directed towards a system and method using sampling for allocating web page placements in online publishing of content. A multi-armed bandit model may be created for sampling content items by allocating web page placements of different quality and optimizing payments to maximize revenue. As used herein, a web page placement may mean a location on a web page designated for placing an item for display. The item may be an advertisement, content, a product, a service, or any other item that may be displayed. A web page placement may also include additional information such as a target group of visitors to be shown the item. An online publishing application may deploy a multi-armed bandit engine to learn the valuation of new content items using sampling. Through a process of valuation discovery, the click-through rate for content items may be learned and the value of content items to publishers may be learned. As the process of valuation discovery progresses, the algorithm more closely approximates the click-through rates for content items in order to allocate web page placements to content items that may maximize revenue.

As will be seen, the framework described may support many online publishing applications for learning the valuation of new content items displayed online. For example, online publishing applications may use the present invention to optimize content layout for content items from various editors. As will be understood, the various block diagrams, flow charts and scenarios described herein are only examples, and there are many other scenarios to which the present invention will apply.

Figure 2:
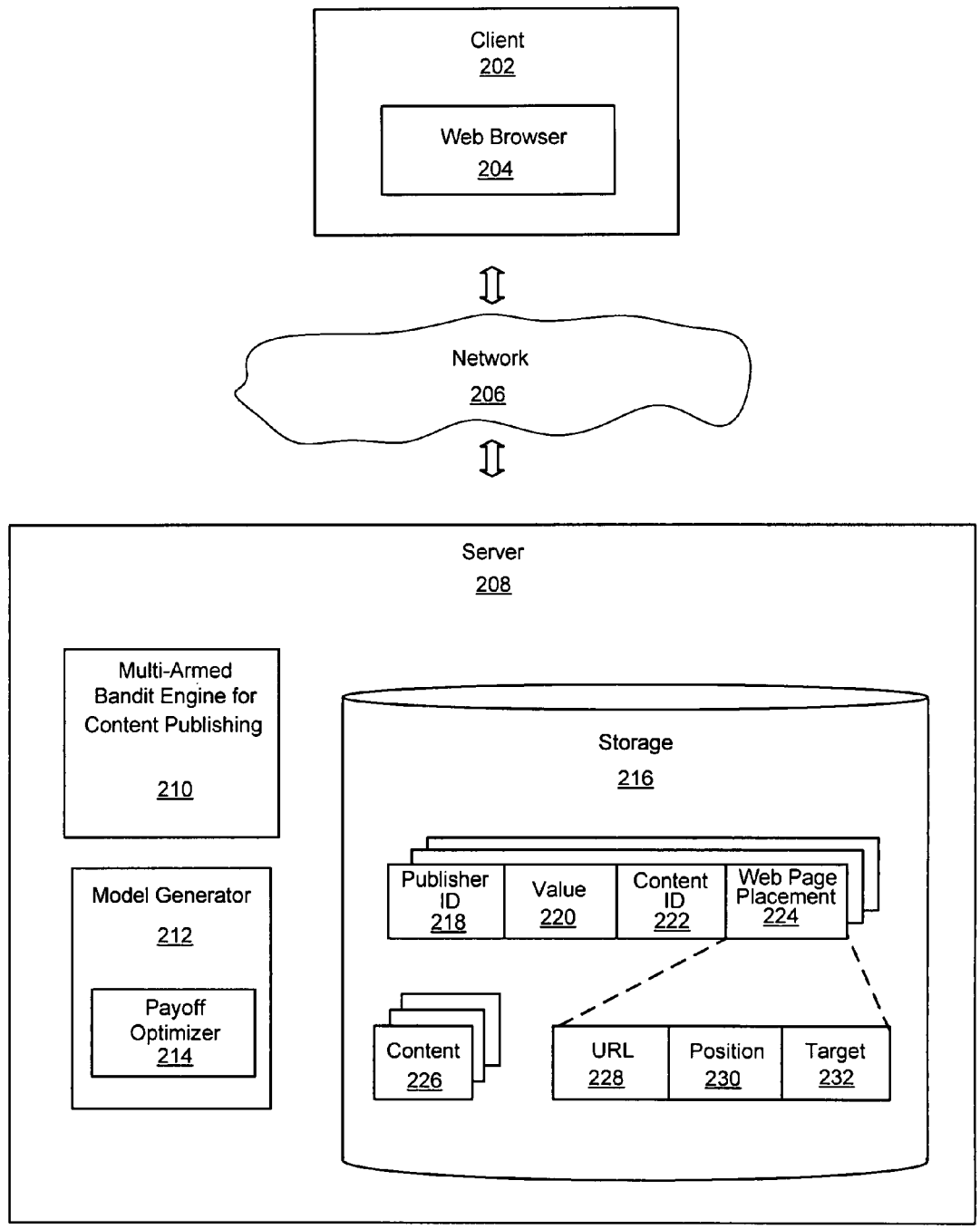
FIG. 2 is a block diagram generally representing an exemplary architecture of system components for using sampling to allocate web page placements in online publishing of content, in accordance with an aspect of the present invention.

Turning to FIG. 2 of the drawings, there is shown a block diagram generally representing an exemplary architecture of system components for using sampling to allocate web page placements in online publishing of content. Those skilled in the art will appreciate that the functionality implemented within the blocks illustrated in the diagram may be implemented as separate components or the functionality of several or all of the blocks may be implemented within a single component. For example, the functionality for the model generator 212 may be included in the same component as the multi-armed bandit engine for content publishing 210. Or the functionality of the payoff optimizer 214 may be implemented as a separate component from the model generator 212. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 208 by a network 206. The client computer 202 may be a computer such as computer system 100 of FIG. 1. The network 206 may be any type of network such as a local area network (LAN), a wide area network (WAN), or other type of network. A web browser 204 may execute on the client computer 202 and may include functionality for receiving a request entered by a user to retrieve content. The web browser 204 may include functionality for receiving a query entered by a user and for sending a query request to a server to obtain a list of search results. In general, the web browser 204 may be any type of interpreted or executable software code such as a kernel component, an application program, a script, a linked library, an object with methods, and so forth.

The server 208 may be any type of computer system or computing device such as computer system 100 of FIG. 1. In general, the server 208 may provide services for publishing content and may include services for providing a list of content items as search results of query processing. In particular, the server 208 may include a multi-armed bandit engine for content publishing 210 for choosing content items for web page placement locations, a model generator 212 for creating a multi-armed bandit model for content publishing used by the multi-armed bandit engine for content publishing 210, and a payoff optimizer 214 for optimizing payments to maximize revenue. Each of these modules may also be any type of executable software code such as a kernel component, an application program, a linked library, an object with methods, or other type of executable software code.

The server 208 may be operably coupled to a database of information such as storage 216 that may include a publisher ID 218 that may be associated with a value 220 for a content item referenced by a content ID 222 to be displayed according to the web page placement 224. The web page placement 224 may include a Uniform Resource Locator (URL) 228 for a web page, a position 230 for displaying a content item on the web page, and a target ID 232 for referencing a target or group of visitors that may be defined by a profile of characteristics that may match a visitor of the web page. In various embodiments, a target may be defined by demographic information including gender, age, or surfing behavior. Any type of content items 226 may be associated with a publisher ID 218. In an embodiment, publishers may have multiple publisher IDs 218 representing several values for various web page placements and the payments for allocating web page placements for values may be optimized using the multi-armed bandit engine for content publishing to maximize revenue.

There may be many applications which may use the present invention for online publishing of content. For example, online publishing applications may use the present invention to optimize layout of content from various content properties to maximize revenue. Or online publishing applications may use the present invention to optimize placement of content items for user-level content personalization. For any of these applications, content layout may be optimized to maximize revenue from the online publishing system.

A classic multi-armed bandit (MAB) that may be generalized to allow the allocation of web page placements may be used to learn the valuation of content items. In general, the multi-armed bandit is a well studied problem (see, for example, D. A. Berry and B. Fristedt, *Bandit Problems*, Sequential Allocation of Experiments, Chapman and Hall, 1985; H. Robbins, *Some Aspects of the Sequential Design of Experiments*, In Bulletin of the American Mathematical Society, volume 55, pages 527-535, 1952) which deals with the balancing of exploration and exploitation in online problems with multiple possible solutions. In the simplest version of the MAB problem, a user must choose at each stage (the number of stages is known in advance) a single bandit/arm. This bandit will yield a reward which depends on some hidden distribution. The user must then choose whether to exploit the currently best known distribution or to attempt to gather more information on a distribution that currently appears suboptimal. The MAB is known to be solvable via the Gittins index (see, for example, J. C. Gittins, Multi-armed Bandit Allocation Indices, Wiley, New York, Mathematical Reviews: MR90e:62113, 1989) and there are solutions which approximate the optimal expected payoff. Due to its simplicity and optimal sampling complexity, the MAB solution in E. Even-Dar, S. Manor, and Y. Mansour, *PAC Bounds for Multi-Armed Bandit and Markov Decision Processes*, The Fifthteenth Annual Conference on Computational Learning Theory 2002, may be generalized for use in allowing the allocation of different web page placements for content items to learn publishers' valuations.

Although the MAB has been extensively studied, it has generally been studied in the context of a single user choosing from non-strategic arms (see R. Kleinberg, *Anytime Algorithms for Multi-Armed Bandit Problems*, Proceedings of the 17th ACM-SIAM Symposium on Discrete Algorithms (SODA 2006)), even when studied in the context of slot auctions (see S. Pandey and C. Oston, *Handling Advertising of Unknown Quality in Search Advertising*, NIPS 2006). However, the MAB has not been previously implemented in previous work as a truthful mechanism for strategic arms, allowing different slots with varying quality, and publishers' private information to be reported, including valuation. In the context of an online publishing system for content items, the arms/publishers will act as strategic utility-maximizing agents. By defining the content publishing problem as an instance of a truthful mechanism for MAB, the optimal payoff for the MAB may be approximated, and hence the maximum revenue for publishing content items may be approximated.

When looking at randomized algorithms for mechanism design, the notion of truthfulness that may be used should be carefully selected. Since click through rates by users are being sampled, for any finite time horizon T, there is a finite probability that the sampling is done incorrectly and hence will influence the truthfulness. In this case, the notion of truthfulness with high probability due to A. Archer, C. Papadimitriou, K. Talwar, and E. Tardos, *An Approximate Truthful Mechanism for Combinatorial Auctions with Single Parameter Agents*, In Proc. of the 14th SODA, 2003, may be used for finite time horizons. Furthermore, the algorithm should also be truthful in expectation.

In the model of the present invention, N risk neutral, utility maximizing publishers may bid for publication slots for publishing N content items. The present invention may also apply for a bidding process for publication slots based on a keyword or keywords. Suppose without loss of generality that content items may appear at every time t displayed in $K_t$ slots. Assume for the ease of exposition that $K_t = K_{t+1} = K$ for all time period t. Also assume without the loss of generality that K=N, since superfluous slots can remain blank. Each content item i may have a private value for each click through which may be denoted by $v_i$. This value may be independent of the slot the content item may have originally appeared in.

The algorithm may run in time rounds starting at t=1 and ending at t=T. During each round, the algorithm allocates content items to the $K_t$ slots (or if there are too many slots to some portion of the slots). Furthermore, assume that the "quality" of each slot (which may be essentially the probability of a click though if a content item appears in that slot) may be monotonically decreasing and may be independent of the content items. Thus, the first slot may have the highest probability to be clicked on regardless of the content item presented in it. The second slot may have the second highest probability to be clicked on, and so forth.

Since different slots may be of different quality, if a content item of publisher a is presented in the first slot and gets a click and a content item of publisher b is presented in the second slot and does not gets a click, publisher a's click through rate may not be simply updated with an extra click and publisher b's click through rate may not be simply reduced since as it may not be known what clicks may have happened if a content item of publisher b was presented in the first slot. In order to be able to compare click through rates across slots, normalization constants may be defined between slots j−1 and j for all $K \geq j > 1$. A click in slot j may be denoted by $r_j$ and an absence of a click in slot j may be denoted by $\neg r_j$. There may be four cases:

$\beta_j^1$—the probability that a content item would have been clicked in slot j (if it had been shown in slot j) given that it was clicked in slot j−1, i.e., $\beta_j^1 = \Pr[r_j | r_{j-1}]$.

$\beta_j^2$—the probability that a content item would have been clicked in slot j given that it was not clicked in slot j−1, i.e., $\beta_j^2 = \Pr[r_j | \neg r_{j-1}]$.

$\tilde{\beta}_j^1$—the probability that a content item would have been clicked in slot j−1 given that it was clicked in slot j, i.e., $\tilde{\beta}_j^1 = \Pr[r_{j-1} | r_j]$.

$\tilde{\beta}_j^2$—the probability that a content item would have been clicked in slot j−1 given that it was not clicked in slot j, i.e., $\tilde{\beta}_j^2 = \Pr[r_{j-1} | \neg r_j]$.

In general, the assumption that a click through rate decays monotonically with lower slots by the same factors for each publisher has been widely assumed in practice and in theory. The common assumption of monotonicity may be generalized to assume that there may exist constants that allow the calculation of all of the conditional probabilities both when there may be a click through and when there is may not. Given the large content available for online publication, this assumption is well justified in practice.

Each content item i may have a click through rate $\alpha_i$ which may represent the probability of a click on the content item given that it appeared in the first slot. (The normalization constants enable the use of the first slot as a baseline.) This value may be unknown to the publisher of content item i as well as to the mechanism. Since $\alpha_i$ may be unknown to the publisher of content item i and the mechanism, it may be estimated at each time t and the observed probability may be denoted by $\alpha_i^t$.

Finally, consider the value for each click-through stated by a publisher for content item i to the mechanism to be denoted by $\bar{v}_i$ (which might not be the true value). Also consider the price which a publisher of content item i is charged at time t by the mechanism to be denoted by $p_i^t \leq \bar{v}_i$. Assuming that content items may have a quasi-linear utility function, placing content item i at slot j at time t obtains an expected utility $\beta_2^1 \ldots \beta_j^1 \alpha_i^t(v_i-p_i^t)$ per impression at time t.

A multi-armed bandit mechanism may be applied to a model of publishers bidding for publishing slots. In general, the multi-armed bandit problem is a statistical decision model of an agent trying to optimize his decisions while improving his information at the same time. More particularly, in the multi-arm bandit problem, the gambler has to decide which arm of K different slot machines to play in a sequence of trials so as to maximize his reward.

In practice, the bandit problem may be formulated as an infinite horizon Markov decision problem in discrete time with time index t=0, 1, ... T. At each time t the decision maker chooses amongst N arms and this choice may be denoted by $\alpha_t \in \{1, \ldots, N\}$. If $\alpha_t=i$, a random payoff $x_t^i$ is realized and the associated random variable may be denoted by $X_t^i$. Applied to the model of allocating slots for content publishing, $x_t^i = \alpha_i^t \cdot v_i$ where the click through rate $\alpha_i^t$ may be the random payoff element of the problem while the value $v_i$ may be a constant, hence the total payoff for arm i may be $v_i \times \alpha_t^i$. The state variable of the Markovian decision problem is given by $s_t$, where in the model of the slot allocation, a vector of all allocated content items' click-through-rates at time t, $\alpha_t^i$ and 0 if i is not allocated a slot in time t. The distribution of $x_t^i$ may be $F^i(\cdot; s_t)$.

The state transition function $\phi$ depends on the choice of the arm and the realized payoff: $s_{t+1} = \phi(x_t^i; s_t)$. Consider $S_t$ to denote the set of possible states in period t. A feasible Markov policy $\alpha = \{\alpha_t\}_{t=0}^{\infty}$ may select an available alternative for each conceivable state $s_t$, i.e., $\alpha_t: S_t \to \{1, \ldots, N\}$. Payoffs may be evaluated according to the discounted expected payoff criterion where the discount factor $\chi$ satisfies $0 \leq \chi < 1$. The motivation for assuming a discount factor is that the seller of the slot prefers payment sooner rather than later. The payoff from each i depends only on outcomes of periods with $\alpha_t=i$. In other words, the state variable $s_t$ may be decomposed into N components $(s_t^1, \ldots, s_t^N)$ such that for all i: $s_{t+1}^i = s_t^i$ if $\alpha_t \neq i$, $s_{t+1}^i = \phi(s_t^i; x_t)$ if $\alpha_t = i$, and $F^i(\cdot; s_t) = F^i(\cdot; s_t^i)$.

Consider $X^i(s_t^i)$ to denote the random variable with distribution $F^i(\cdot; s_t^i)$. Then the problem of finding the optimal allocation policy may be the solution to the following intertemporal optimization problem:

$$V(s_0) = \sup_a \left\{ E \sum_{t=0}^{\infty} \chi^t X^{a_t}(s_t^{a_t}) \right\},$$

where $V(s_0)$ is the value function of the bandit problem.

The algorithm for a multi-armed bandit mechanism applied to the model of allocating publishing slots may be illustrated in an embodiment for the simple case when there may be a single slot available at any given time. In this case for each time period t, the set of content items from publishers may be a set S=N where there may not be any knowledge of each content item's click through rate. At each time period t and for each content item i∈S, there may be an estimate of i's click through rate $\alpha_t^i$ as well as an estimate of how accurate that estimation may be using a bound, denoted as $\gamma_{e_i}$, on $|\alpha_t^i - \alpha_t|$ which depends on the number of impressions $e_i$ that publisher i received.

Considering the set $S_t$, there may be an i such that $v_i * \alpha_t^i$ may be maximal. Suppose without loss of generality that the maximal element may be the first element that the bandit algorithm may explore by allocating a slot to that first element. If the algorithm merely chooses to exploit then it could just allocate the slot to the content item of the first publisher. However, there may be other possible content items that are worthy of consideration. These may be content items j such that $v_i(\alpha_t^i - \gamma_{e_i}) < v_j(\alpha_t^j - \gamma_{e_j})$, since the errors of i and j overlap. Therefore, the algorithm may allocate the slot to a random content item whose slot overlaps with the maximal element.

In general, a multi-armed bandit auction algorithm may be applied for the general case when there may be multiple slots available at any given time. Moreover, the slots may be of different quality and care should be taken during the sampling procedure to allocate "better" slots to "better" content items which may optimize payment to maximize revenue. The following pseudocode may represent the main algorithm for a multi-armed bandit for online content publishing when there may be multiple slots available at any given time:

MAB Algorithm for Online Content Publishing
1. Call "Initialization Sub Procedure" to initialize parameters in the online content publishing system
2. Call "Sub Procedure for Choosing the Content Items to Sample" to determine which set of content items to consider to sample
3. If there is a significant proportion of unsampled content items, then call Sub Procedure for Fair Chance Slotting to allocate slots using fair chance slotting, else call Sub Procedure for Slotting Using Iterative Sampling to allocate slots using iterative sampling
4. Call "Update Parameters for Chosen Content Items" to update parameters for sampled content items
5. For every publisher i∈$S_t$, calculate a payoff for allocated content items
6. Update the time t.

In general, the algorithm samples content items i in turn until there is a sufficient gap between the observed payoffs of the K highest content items and content item i such that with sufficient probability the $i^{'th}$ content item is not one of the content items desirable to retain. The algorithm removes all of the content items with a sufficiently large gap and continues to sample the remaining content items as long as there is not a large enough gap between the best content items and the rest of the content items to remove them.

Figure 3:
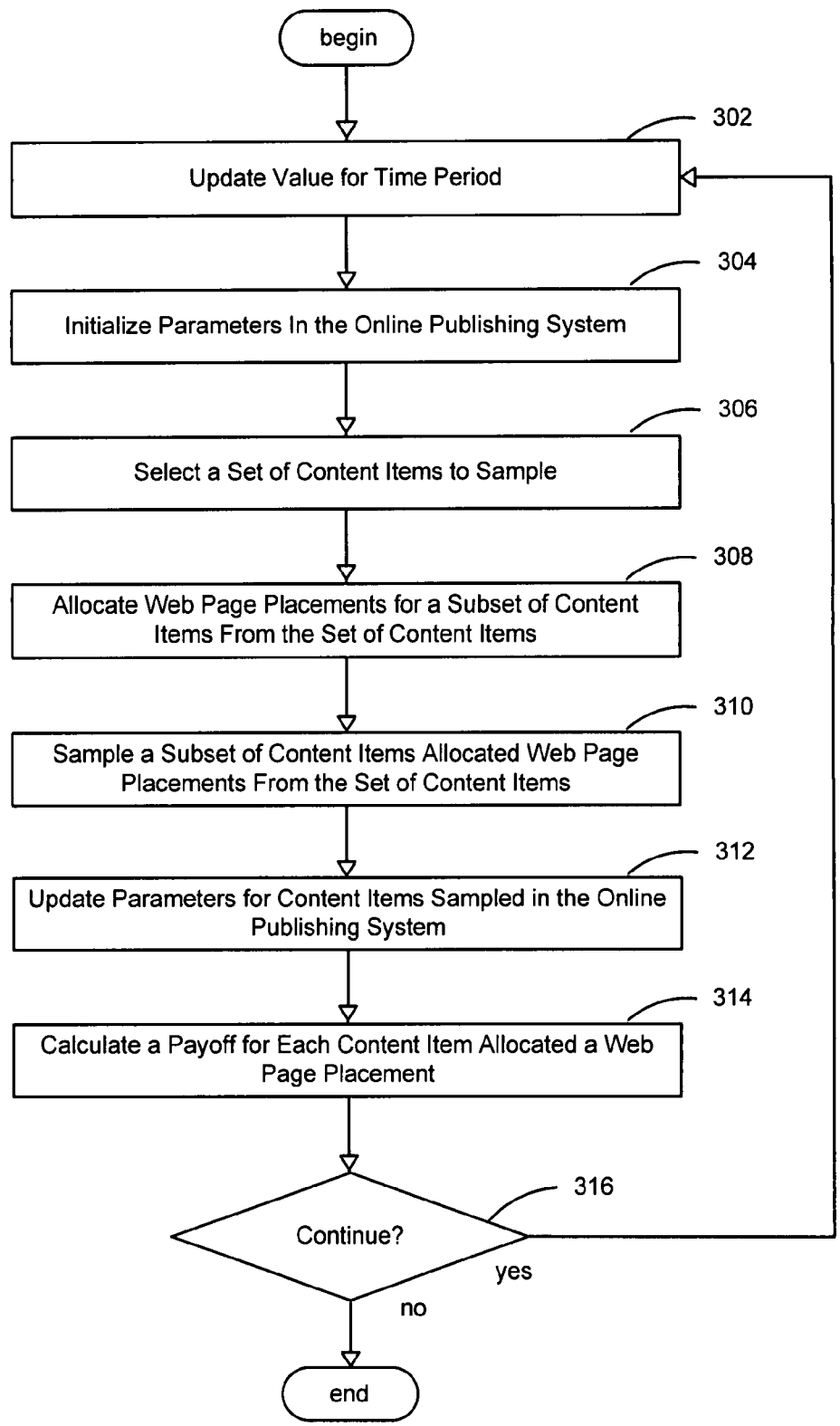
FIG. 3 is a flowchart generally representing the steps undertaken in one embodiment for using sampling to allocate web page placements in online publishing of content, in accordance with an aspect of the present invention.

FIG. 3 presents a flowchart generally representing the steps undertaken in one embodiment for using sampling to allocate web page placements in online publishing of content. The steps of FIG. 3 represent the general steps of the pseudo-code of the MAB Algorithm for Online Content Publishing presented above. At step 302, the value for the time period may be updated. In an embodiment, the value for the time period may be used as a synchronization device since the algorithm may run in time rounds, starting at t=1 and ending at t=T, and the algorithm may allocate content items to the K, slots during each round. Parameters for the online publishing system may be initialized at step 304. At step 306, a set of content items may be selected to sample, and then a subset of content items from the selected set of content items may be allocated web page placements at step 308. The subset of content items allocated web page placements may then be sampled at step 310 in the online publishing system. Parameters for content items sampled in the online publishing system may be updated at step 312. And then a payoff may be calculated for each content item allocated a web page placement at step 314. It may be decided at step 316 to continue processing at step 302 or to end the sampling of content items in the online publishing system.

The following pseudocode may represent the Initialization Sub Procedure used by the MAB Algorithm for Online Content Publishing to initialize parameters in the online content publishing system:

Initialization Sub Procedure
1. All publishers may report their value per click $\bar{v}_i$ for content item i
2. For each content item i of a publisher, set the variables' values as follows:
   Set initial click through rate, $x_i^t=0$
   Set the price charged for current clicks, $p_i^t=0$
   If this is the publisher's first visit, set the exposure $e_i=0$.

Figure 4:
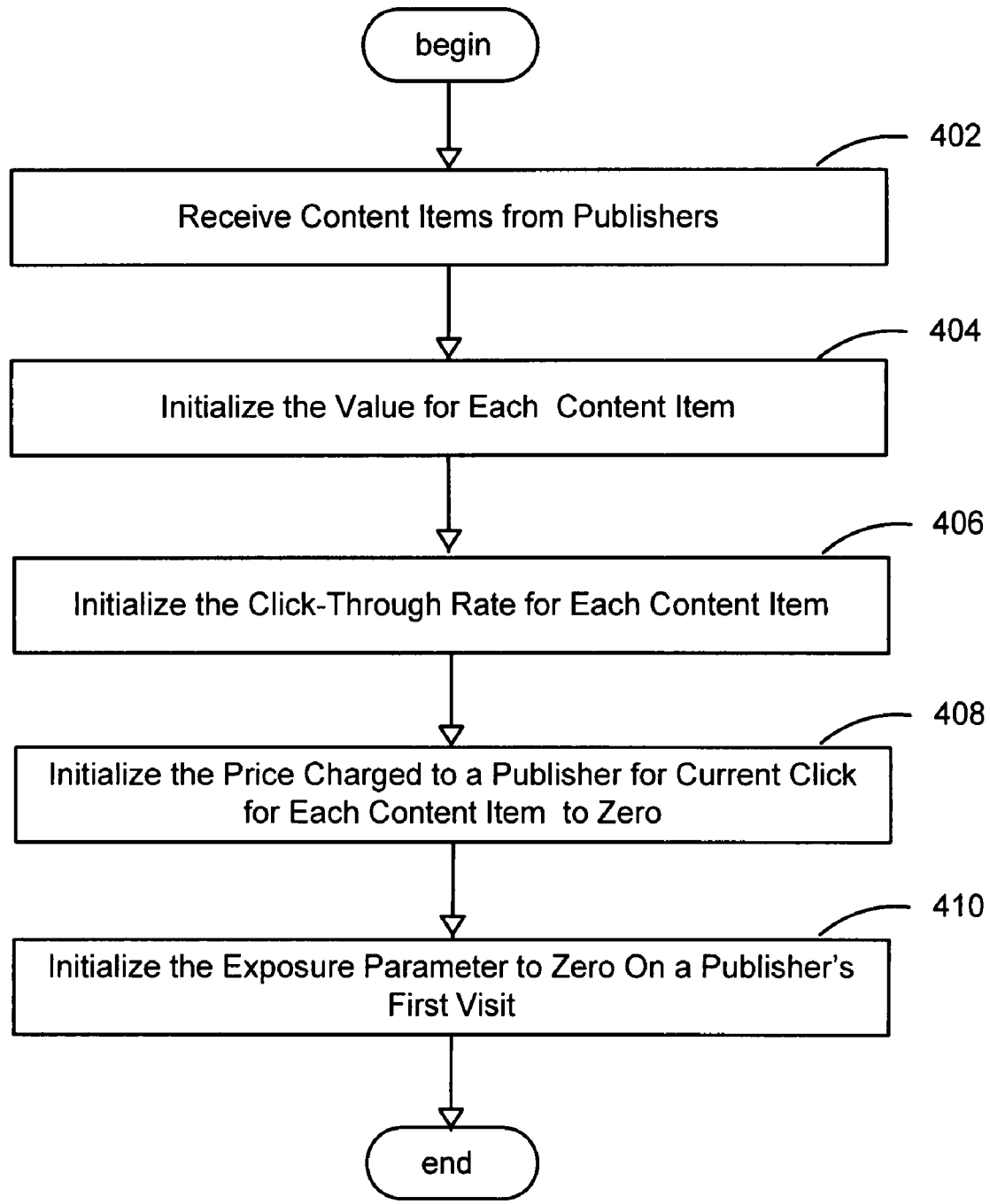
FIG. 4 is a flowchart generally representing the steps undertaken in one embodiment for initializing parameters for the online publishing system, in accordance with an aspect of the present invention.

FIG. 4 presents a flowchart generally representing the steps undertaken in one embodiment for initializing parameters for the online publishing system. At step 402, a set of content items may be received from publishers. At step 404, a value per click may be set for each content item. At step 406, the click-through rate for each content item may be initialized to zero. The price charged to a publisher for a current click may also be initialized to zero at step 408. And the exposure parameter for a publisher may be initialized at step 410 to zero on the publisher's first visit. On subsequent visits, this step may not be performed.

The following pseudocode may represent the Sub Procedure for Choosing the Content Items to Sample to determine which subset of content items to consider to sample:

Sub Procedure for Choosing the Content Items to Sample
1. Set $S_t$ to be the set of content items currently in the system
2. Set $S'_t = S_t$ to be the set of potential content items to sample
3. For every content item $i \in S_t$, define confidence parameter:

$$\gamma_{e_i} = \sqrt{\frac{\log(cne_i^2/\chi)}{e_i} \cdot \frac{1}{\max\{\beta_2^1 \cdot \ldots \cdot \beta_K^1, \tilde{\beta}_K^2 \cdot \tilde{\beta}_{K-1}^1 \cdot \ldots \cdot \tilde{\beta}_2^1\}} \cdot \frac{1}{K}},$$

where c is a constant and $\chi$ is a probability parameter
4. Remove from the set of content items $S'_t$ all of the suboptimal content items: for every content item $i \in S_t$ if there exist K other content items z such that $x_z^t + \gamma_{e_i} > \min\{x_z^t - \gamma_{e_j}\}$, then i is suboptimal and hence we can update $S'_t = S'_t \setminus i$.

Figure 5:
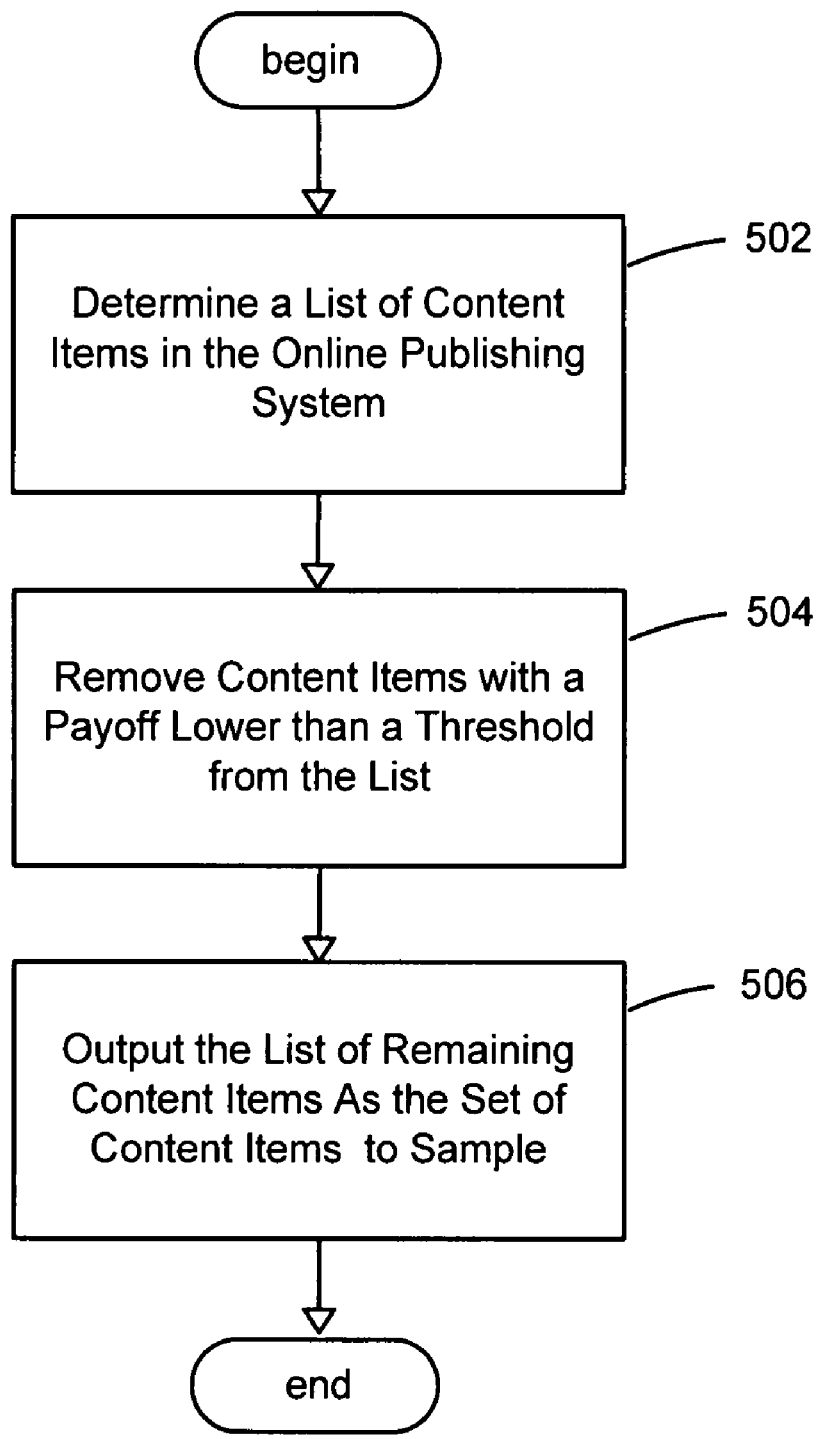
FIG. 5 is a flowchart generally representing the steps undertaken in one embodiment for selecting the set of potential content items in an online auction to sample, in accordance with an aspect of the present invention.

FIG. 5 presents a flowchart generally representing the steps undertaken in one embodiment for selecting the set of potential content items in an online auction to sample. At step 502, a list of content items currently in the online publishing system may be determined. At step 504, content items with a payoff lower than a threshold may be removed from the list. In the embodiment of the Sub Procedure for Choosing the Content Items to Sample, suboptimal content items i may be removed from the set of content items $S'_t$ if there exist K other content items z such that $x_z^t + \gamma_{e_i} > \min\{x_z^t - \gamma_{e_j}\}$, then i may be suboptimal and may be removed from the set of content items, so that $S'_t = S'_t \setminus i$. And the list of remaining content items may be output at step 506 as the set of content items to sample in the online publishing system during the current time period. Note that for each time period, the set of potential content items in the online publishing system to sample are selected from a list of content items currently in the online publishing system as described at step 502 and then suboptimal content items are removed at step 504 just for the current time period.

Figure 6:
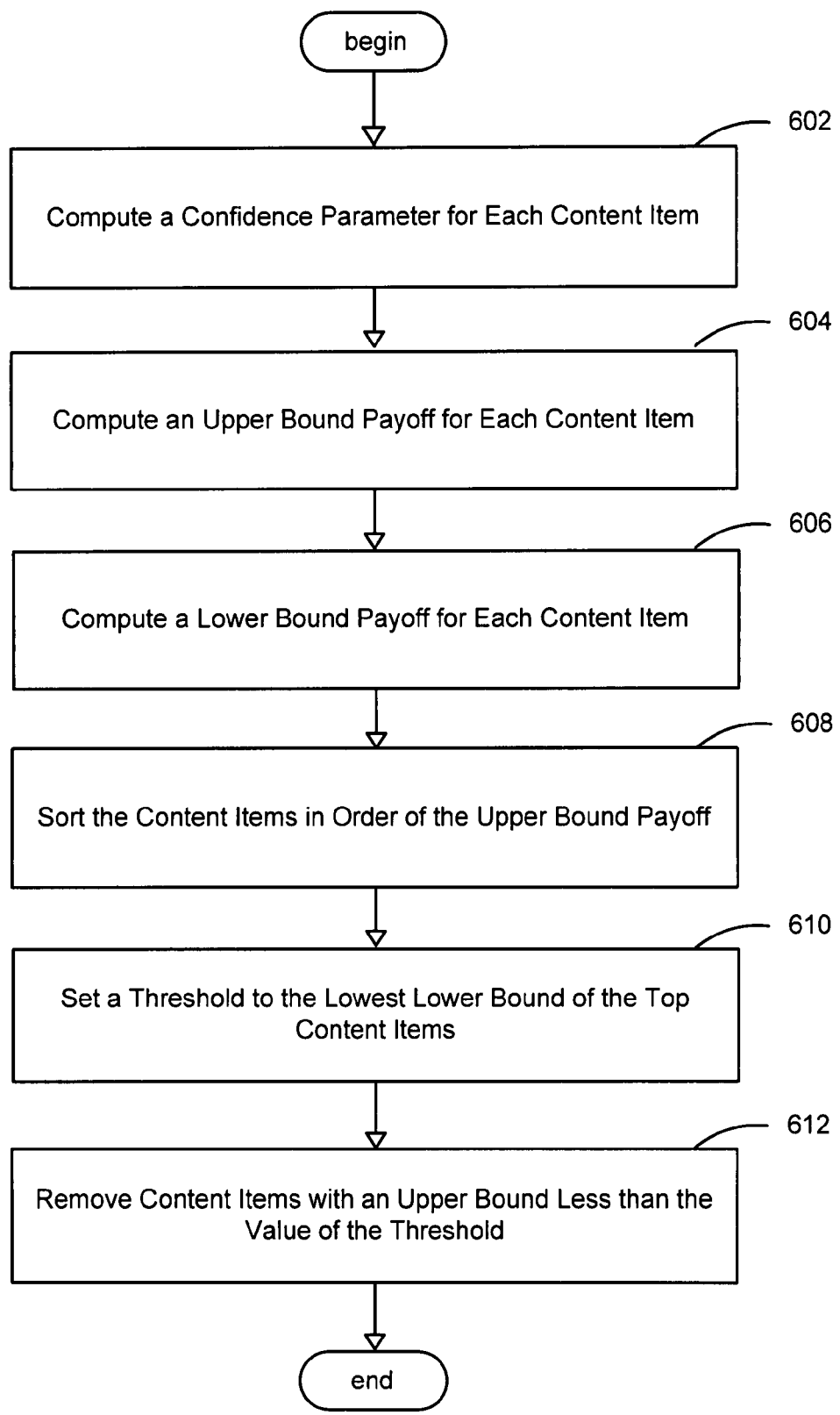
FIG. 6 is a flowchart generally representing the steps undertaken in one embodiment for removing suboptimal content items with a payoff lower than a threshold from a list of content items currently in the online publishing system, in accordance with an aspect of the present invention.

FIG. 6 presents a flowchart generally representing the steps undertaken in one embodiment for removing suboptimal content items with a payoff lower than a threshold from a list of content items currently in the online publishing system. At step 602, a confidence parameter may be computed for each content item currently in the online publishing system. For example, in the embodiment of the Sub Procedure for Choosing the Content Items to Sample, the confidence parameter $$\gamma_{e_i} = \sqrt{\frac{\log(cne_i^2/\chi)}{e_i} \cdot \frac{1}{\max\{\beta_2^1 \cdot \ldots \cdot \beta_K^1, \tilde{\beta}_K^2 \cdot \tilde{\beta}_{K-1}^1 \cdot \ldots \cdot \tilde{\beta}_2^1\}} \cdot \frac{1}{K}},$$

where c is a constant and $\chi$ is a probability parameter, may be computed for every content item $i \in S_t$. At step 604, an upper bound payoff may be computed for each content item. In an embodiment, the upper bound payoff for a content item i in time period t may be represented by $x_i^t + \gamma_{e_i}$. At step 606, a lower bound payoff may be computed for each content item. In an embodiment, the lower bound payoff for a content item i in time period t may be represented by $x_i^t - \gamma_{e_i}$.

The content items may be sorted at step 608 in order of the value of the upper bound payoff. And a threshold may be set to the lowest lower bound of the top K sorted content items at step 610. Then content items with an upper bound less than value of the threshold may be removed from the list of content items currently in the online publishing system at step 612. In the embodiment of the Sub Procedure for Choosing the Content Items to Sample, content items with an upper bound $x_i^t + \gamma_{e_i}$ less than the threshold $\min\{x_z^t - \gamma_{e_j}\}$, where z may denote the top K content items in the sorted list, may be removed from the list of content items currently in the online publishing system.

Figure 7:
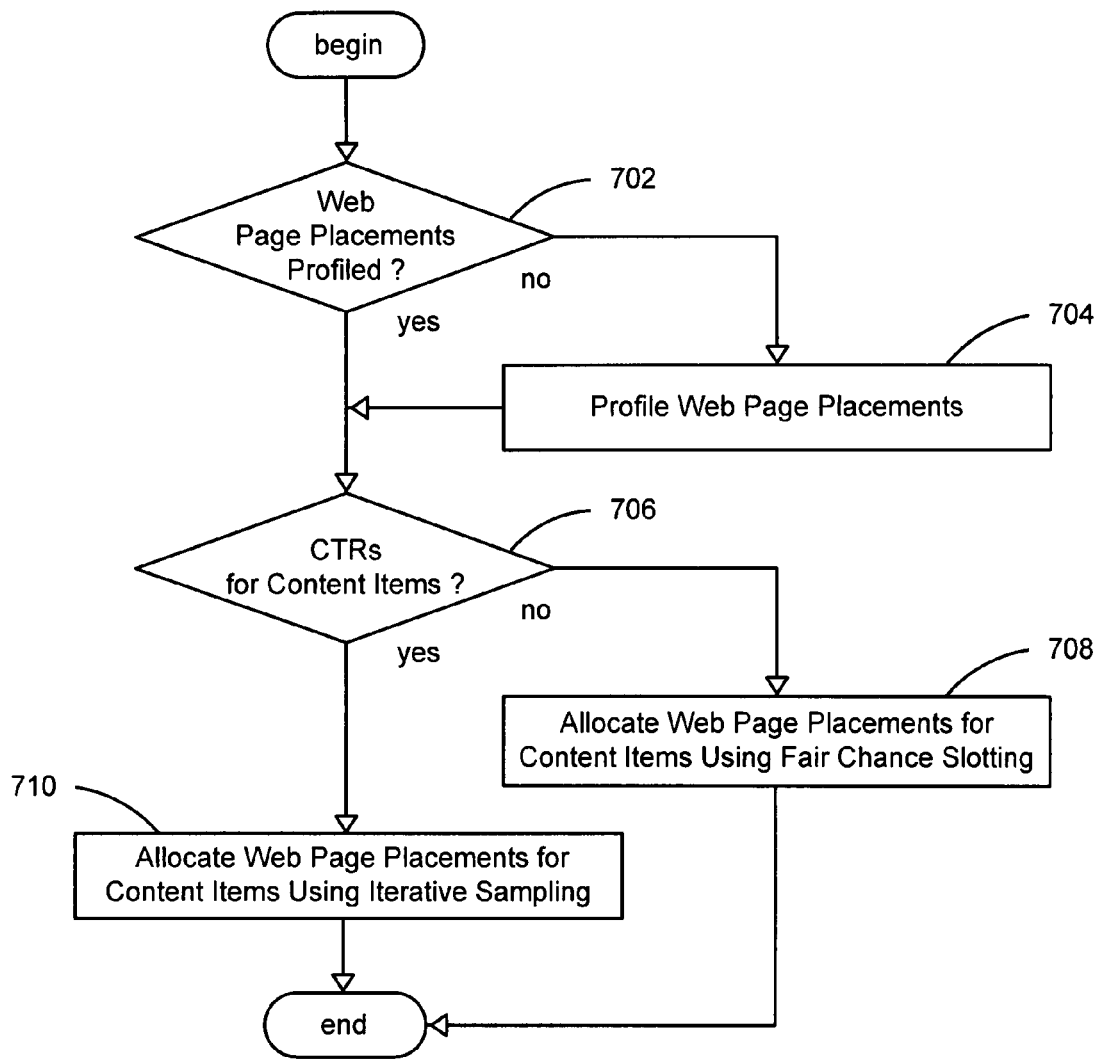
FIG. 7 is a flowchart generally representing the steps undertaken in one embodiment for allocating web page placements for a subset of content items from the set of content items to sample in an online publishing system, in accordance with an aspect of the present invention.

FIG. 7 presents a flowchart generally representing the steps undertaken in one embodiment for allocating web page placements for a subset of content items from the set of content items to sample in an online publishing system. At step 702, it may be determined whether the web page placements have been profiled with an associated click probability. The click probability of a web page placement may indicate the probability of a user clicking on the web page placement irrespective of the content displayed in that location. If it may be determined that the web page placements may not have associated click probabilities, then the web page placements may be profiled at step 704 to determine an associated click probability for each web page placement. In an embodiment, the web page placements may be placed in rank order from top to bottom or left to right, and random test vectors may be created to learn the click probability for each web page placement.

Otherwise, if it may be determined that the web page placements may have associated click probabilities, then it may be determined at step 706 whether a significant proportion of content items to be sampled have click-through rates. In an embodiment, a threshold of greater than 50% may be used to define whether there is a significant proportion of content items that have well known click-through rates, where well known is defined as knowing a click-through rate within +/−0.1%. In practice, this threshold may be emperically tuned by specific online publishing applications. If it may be determined that a significant proportion of content items to be sampled do not have click-through rates, then web page placements may be allocated for content items to be sampled using fair chance slotting at step 708. Otherwise, web page placements may be allocated for content items to be sampled using iterative sampling at step 710.

Figure 8:
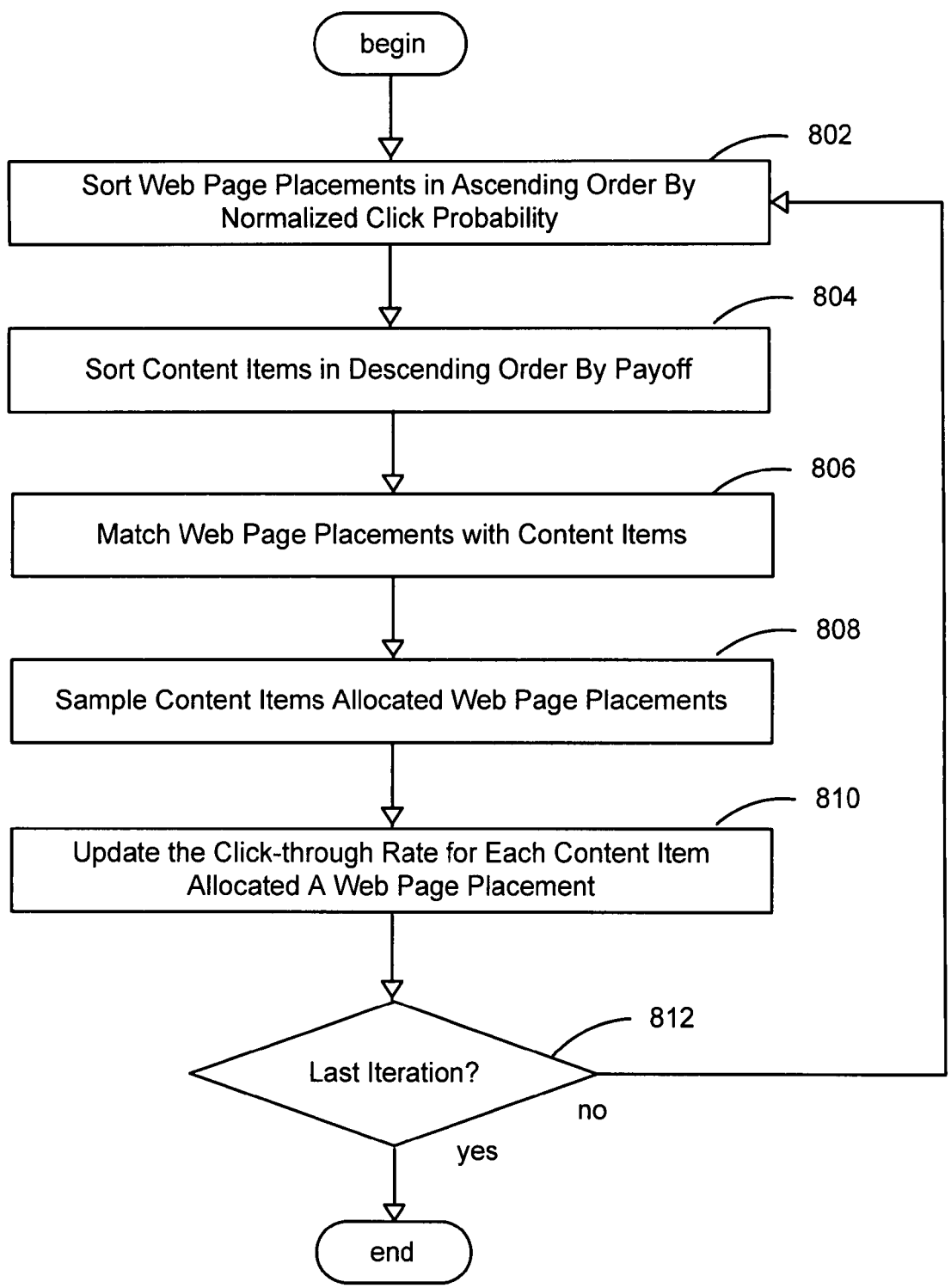
FIG. 8 is a flowchart generally representing the steps undertaken in one embodiment for allocating web page placements for a subset of content items to sampled using fair chance slotting, in accordance with an aspect of the present invention.

FIG. 8 presents a flowchart generally representing the steps undertaken in one embodiment for allocating web page placements for a subset of content items to sampled using fair chance slotting. At step 802, web page placements may be sorted in ascending order by normalized click probability. At step 804, content items may be sorted in descending order by payoff. At step 806, the web page placements sorted in ascending order may be matched with the content items sorted in descending order. This may allow content items with a lower payoff to be allocated locations of web page placements with a higher click probability in order to provide a fair chance to learn click through rates of content items. At step 808, content items allocated web page placements may be sampled, and the click through rate for each content item allocated a web page placement may be updated at step 810. It may be determined at step 812 whether this may be the last iteration of iterative sampling. If so, then processing may be finished for allocating web page placements for a subset of content items to sampled using fair chance slotting. Otherwise, processing may continue at step 802 to allocate web page placements for an unsampled subset of content items using fair chance slotting.

Figure 9:
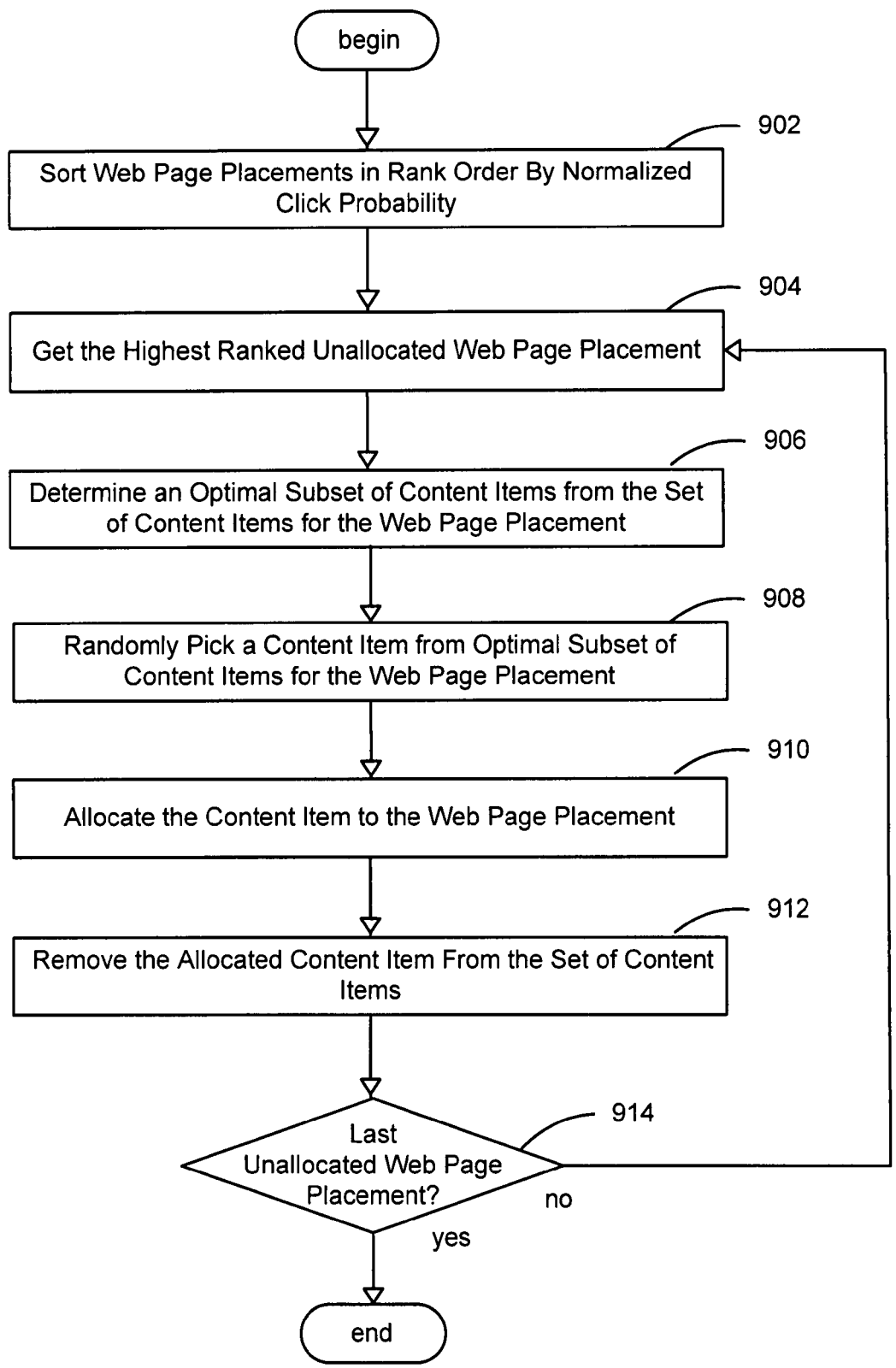
FIG. 9 is a flowchart generally representing the steps undertaken in one embodiment for allocating web page placements for a subset of content items to sampled using iterative sampling, in accordance with an aspect of the present invention.

FIG. 9 presents a flowchart generally representing the steps undertaken in one embodiment for allocating web page placements for a subset of content items to sampled using iterative sampling. At step 902, web page placements may be sorted in rank order by normalized click probability. At step 904, the highest ranked unallocated web page placement may be obtained. At step 906, an optimal subset of content items may be determined for web page placement from the set of content items. In an embodiment, the steps of FIG. 5 and FIG. 6 may be used for determining an optimal subset of content items. At step 908, a content item may be randomly selected from the optimal subset of content items and the content item randomly selected may be allocated to the web page placement at step 910. After the content item may be allocated to the web page placement, the content item may be removed from the set of content items. Note that for each time period, a content item allocated from an optimal subset of content items as described at step 910 may be removed temporarily at step 912 just for the current time period so that the content item may be sampled once during iterative sampling. It may then be determined at step 914 whether the web page allocated a content item was the last unallocated web page. If so, then processing may be finished for allocating web page placements for a subset of content items to sampled using iterative sampling. Otherwise, processing may continue at step 904.

The following pseudocode may represent the Sub Procedure for Update Parameters for Chosen Content Items to update parameters for sampled content items:

Update Parameters for Chosen Content Items
For every sampled content item $i \in S'_t$ update parameters:
1. $e_i = e_i + 1$ and update $\gamma e_i$ accordingly,
2. Update $\alpha_i^t$ accordingly if i was click/not clicked,
3. Update $x_i^t$ accordingly if i was click/not clicked.

Figure 10:
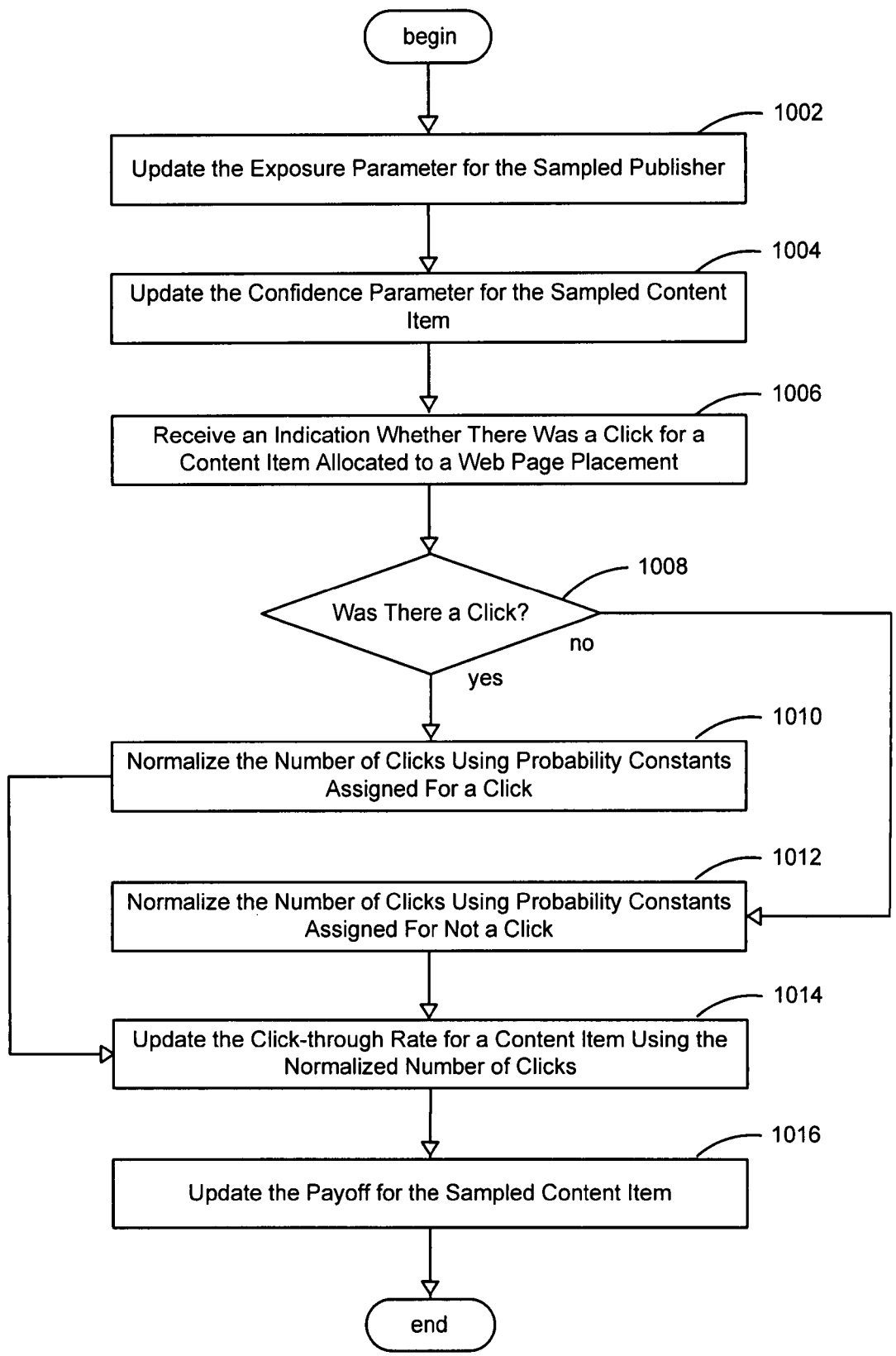
FIG. 10 is a flowchart generally representing the steps undertaken in one embodiment for updating parameters for sampled content items, in accordance with an aspect of the present invention.

FIG. 10 presents a flowchart generally representing the steps undertaken in one embodiment for updating parameters for sampled content items. At step 1002 an exposure parameter for a sampled publisher may be updated, and a confidence parameter for a sampled content item may be updated at step 1004. In the embodiment of the Sub Procedure for Update Parameters for Chosen Content Items, for instance, the exposure parameter $e_i$ may be incremented such as $e_i = e_i + 1$, and $\gamma e_i$ may be updated. At step 1006, an indication may be received whether there was a click for a content item allocated to a web page placement. It may be determined at step 1008 whether there was a click received for a content item allocated to a web page placement. If so, then the number of clicks may be normalized at step 1010 using probability constants assigned for the web page placement allocated for the content item that received a click. If not, then the number of clicks may be normalized at step 1012 using probability constants assigned for the web page placement allocated for the content item that did not receive a click. At step 1014, the click-through rate for the content item may be updated using the normalized number of clicks. At step 1016, the payoff for the sampled content item may be calculated. Then processing for updating parameters for sampled content items may be finished.

Thus the present invention may optimize layout of content on web pages in an online publishing system to maximize revenue. In addition to optimizing content online for general audiences, the present invention may support optimizing personalized content online. For example, users that may enjoy similar content may be clustered into segments and content for each segment may be optimized by deploying a multi-armed bandit engine for sampling content items for a particular segment by allocating web page placements of different quality and optimizing payments to maximize revenue. For any of these applications, the present invention may provide editors with feedback to compare the performance of content.

As can be seen from the foregoing detailed description, the present invention provides an improved system and method for allocating web page placements by using sampling in online publishing of content. An online publishing application may deploy a multi-armed bandit engine to learn the valuation of new content items using sampling and to allocate web page placements of different quality to optimize payments to maximize revenue. Through a process of valuation discovery, the click-through rate for content items may be learned and the value of content items to publishers may be learned. As the process of valuation discovery progresses, the algorithm more closely approximates the click-through rates for content items in order to allocate web page placements to content items that may maximize revenue. Those skilled in the art will appreciate that the present invention may maximize different definitions of valuation other than revenue, including clicks, popularity, impressions, and so forth Such a system and method may tune content publishing in real time from user input. As a result, the system and method provide significant advantages and benefits needed in contemporary computing, and more particularly in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for publishing content, comprising:
a memory storing computer-executable instructions;
a processor device operably coupled with the memory, said processor device executing a multi-armed bandit engine for learning the valuation of a plurality of content items through sampling by scheduling the content items for web page placements to optimize payments for maximizing revenue;
wherein the multi-armed bandit engine schedules the content items for web page placement by:
selecting an optimal set of content items to sample from the plurality of content items;
allocating a web page placement for a content item in the optimal set of content items to maximize revenue, wherein allocating said web page placement comprises:
sorting a plurality of web page placements in ascending order by normalized click probability;
sorting the optimal set of content items in descending order by payoff;

matching the plurality of web page placements in ascending order with a plurality of content items of the optimal set of content items in descending order; and allocating the plurality of web page placements matched to the plurality of content items of the optimal set of content items;

sampling the plurality of content items allocated to the plurality of web page placements;

updating a click-through rate for the content item sampled; and calculating a charge for the content item allocated to the web page placement; and a storage operably coupled to the processor device for storing a plurality of valuations each associated with a content item allocated to a web page placement for online publishing of content.

2. The system of claim 1 further comprising a model generator for creating a multi-armed bandit model used by the multi-armed bandit engine.

3. The system of claim 1 further comprising a payoff optimizer operably coupled to the multi-armed bandit engine for optimizing payments for the content items sampled online to maximize revenue.

4. A computer-implemented method for publishing content, comprising:
using a processor device configured to perform:
selecting an optimal set of content items to sample from a plurality of content items;
allocating a web page placement for a content item in the optimal set of content items to maximize revenue, wherein allocating said web page placement comprises:
sorting a plurality of web page placements in ascending order by normalized click probability;
sorting the optimal set of content items in descending order by payoff;
matching the plurality of web page placements in ascending order with a plurality of content items of the optimal set of content items in descending order; and
allocating the plurality of web page placements matched to the plurality of content items of the optimal set of content items;
sampling the plurality of content items allocated to the plurality of web page placements;
updating a click-through rate for the content item sampled; and
calculating a charge for the content item allocated to the web page placement.

5. The method of claim 4 further comprising receiving the plurality of content items.

6. The method of claim 4 further comprising initializing a value per click of each content item of the plurality of content items.

7. The method of claim 4 further comprising initializing the click-through rate for each of the plurality of content items.

8. The method of claim 4 further comprising initializing a price charged for a click of a content item for each of the plurality of content items.

9. The method of claim 4 further comprising initializing an exposure parameter for each of a plurality of publishers on a first visit in an online publishing system.

10. The method of claim 4 wherein selecting an optimal set of content items to sample from a plurality of content items comprises:

determining a list of the plurality of content items;
removing content items with a payoff lower than a threshold from the list; and
outputting the remaining list of the plurality of content items as the optimal set of content items to sample.

11. The method of claim 4 wherein allocating a web page placement for a content item in the optimal set of content items to maximize revenue comprises:
sorting a plurality of web page placements in rank order by normalized click probability;
obtaining the highest ranked unallocated web page placement in the rank order;
determining an optimal subset of content items from the optimal set of content items;
randomly selecting the content item from the optimal subset of content items;
allocating the highest ranked unallocated web page placement to the content item randomly selected; and
removing the content item randomly selected from the optimal set of content items.

12. The method of claim 4 further comprising updating a payoff rate for the sampled content item.

13. The method of claim 4 further comprising updating a confidence parameter for the sampled content item.

14. The method of claim 4 wherein updating a click-through rate for the content item sampled comprises updating the click-through rate for the content item sampled using a normalized number of clicks.

15. The method of claim 14 wherein updating the click-through rate for the content item sampled using a normalized number of clicks comprises updating the click-through rate for the content item sampled using probability constants.

16. A non-transitory computer-readable medium having computer-executable instructions for performing;
selecting an optimal set of content items to sample from a plurality of content items;
allocating a web page placement for a content item in the optimal set of content items to maximize revenue, wherein allocating said web page placement comprises:
sorting a plurality of web page placements in ascending order by normalized click probability;
sorting the optimal set of content items in descending order by payoff;
matching the plurality of web page placements in ascending order with a plurality of content items of the optimal set of content items in descending order; and
allocating the plurality of web page placements matched to the plurality of content items of the optimal set of content items;
sampling the plurality of content items allocated to the plurality of web page placements;
updating a click-through rate for the content item sampled; and
calculating a charge for the content item allocated to the web page placement.

17. A computer-implemented method for publishing content, comprising:
using a processor device configured to perform:
selecting an optimal set of content items to sample from a plurality of content items;
allocating a web page placement for a content item in the optimal set of content items to maximize revenue, wherein allocating said web page placement comprises:

sorting a plurality of web page placements in rank order by normalized click probability;
obtaining a highest ranked unallocated web page placement in the rank order;
determining an optimal subset of content items from the optimal set of content items;
randomly selecting a content item from the optimal subset of content items;
allocating the highest ranked unallocated web page placement to the content item randomly selected; and
removing the content item randomly selected from the optimal set of content items;
sampling the content item allocated to the web page placement;
updating a click-through rate for the content item sampled; and
calculating a charge for the content item allocated to the web page placement.

18. The computer-implemented method of claim 17 wherein selecting the optimal set of content items to sample from the plurality of content items comprises:
generating a list of the plurality of content items;
removing content items with a payoff lower than a threshold from the list; and
outputting the list of the plurality of content items as the optimal set of content items to sample.

* * * * *